United States Patent
Fu et al.

(10) Patent No.: US 9,663,706 B2
(45) Date of Patent: May 30, 2017

(54) METHOD TO ENHANCE FIBER BRIDGING

(75) Inventors: Diankui Fu, Kuala Lumpur (MY); Elena Nikolaevna Tarasova, Surgut Region (RU); Vadim Kamil'evich Khlestkin, Novosibirsk (RU); Dmitry Ivanovich Potapenko, Novosibirsk (RU); Vladimir Sergeevich Bugrin, Moscow (RU)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 13/879,023

(22) PCT Filed: Nov. 12, 2010

(86) PCT No.: PCT/RU2010/000667
§ 371 (c)(1),
(2), (4) Date: Aug. 20, 2013

(87) PCT Pub. No.: WO2012/064213
PCT Pub. Date: May 18, 2012

(65) Prior Publication Data
US 2013/0327527 A1    Dec. 12, 2013

(51) Int. Cl.
*E21B 33/138* (2006.01)
*C09K 8/68* (2006.01)
(Continued)

(52) U.S. Cl.
CPC .............. *C09K 8/685* (2013.01); *C09K 8/03* (2013.01); *C09K 8/70* (2013.01); *E21B 33/138* (2013.01);
(Continued)

(58) Field of Classification Search
CPC ....................................................... C09K 8/74
See application file for complete search history.

(56) References Cited

U.S. PATENT DOCUMENTS 3,707,194 A * 12/1972 Svaldi .................... C09K 8/882
166/270
5,508,973 A    4/1996 Mallick et al.
(Continued)

FOREIGN PATENT DOCUMENTS

EA    200600025       10/2006
EA    200701755 A1    4/2008
(Continued)

OTHER PUBLICATIONS

P.A. Gillespie, et al., "Measurement and characterization of spatial distributions of fractures," Tectrophysics. 226 pp. 113-141.
(Continued)

*Primary Examiner* — Angela M DiTrani
*Assistant Examiner* — Andrew H Sue-Ako
(74) *Attorney, Agent, or Firm* — Michael L. Flynn; Jody Lynn DeStefanis; Robin Nava (57) ABSTRACT

A method of treating a geologic formation including injecting into a wellbore a high viscosity composition which comprises a base fluid wherein the base fluid has an initial viscosity of 100 cP or greater and which exhibits a decrease in viscosity upon exposure to a viscosity reducing agent, and fibers wherein the fibers exhibit flocking upon a decrease in the viscosity of the base fluid, and injecting into the wellbore a viscosity reducing agent wherein the viscosity reducing agent is injected into the wellbore with or separately from the high viscosity composition is provided.

20 Claims, 5 Drawing Sheets

(51) Int. Cl.
*C09K 8/03* (2006.01)
*C09K 8/70* (2006.01)

(52) U.S. Cl.
CPC ...... *C09K 2208/08* (2013.01); *C09K 2208/30* (2013.01)

(56) References Cited

U.S. PATENT DOCUMENTS

| | | | | |
|---|---|---|---|---|
| 6,837,309 | B2* | 1/2005 | Boney et al. | 166/280.2 |
| 6,908,888 | B2* | 6/2005 | Lee et al. | 507/219 |
| 6,938,693 | B2* | 9/2005 | Boney et al. | 166/280.1 |
| 7,066,260 | B2* | 6/2006 | Sullivan et al. | 166/280.1 |
| 7,350,572 | B2 | 4/2008 | Fredd et al. | |
| 7,565,929 | B2 | 7/2009 | Bustos et al. | |
| 2002/0004464 | A1* | 1/2002 | Nelson et al. | 507/200 |
| 2002/0160174 | A1* | 10/2002 | Nanko et al. | 428/294.7 |
| 2003/0166471 | A1* | 9/2003 | Samuel | C09K 8/06 507/200 |
| 2006/0054324 | A1* | 3/2006 | Sullivan et al. | 166/308.1 |
| 2006/0180310 | A1 | 8/2006 | Welton et al. | |
| 2007/0032386 | A1* | 2/2007 | Abad et al. | 507/201 |
| 2009/0044945 | A1* | 2/2009 | Willberg et al. | 166/308.1 |
| 2009/0255677 | A1* | 10/2009 | Bryant et al. | 166/300 |
| 2010/0152070 | A1 | 6/2010 | Ghassemzadeh | |
| 2011/0059883 | A1* | 3/2011 | Swazey, Jr. | C08L 1/02 510/320 |
| 2013/0228336 | A1* | 9/2013 | Droger | C09K 8/506 166/305.1 |

FOREIGN PATENT DOCUMENTS

| | | |
|---|---|---|
| EP | 1789650 | 11/2008 |
| EP | 1534926 | 11/2009 |
| RU | 2209297 C2 | 7/2003 |
| WO | 03023177 A2 | 3/2003 |
| WO | 2010/068137 | 6/2010 |

OTHER PUBLICATIONS

M. Kachanov, "Continuum model of medium with cracks," J. Engng. Mech. Div. ASCE, 106, pp. 1039-1051.
H.B. Lynn, et al, Natural fracture characterization using P-wave reflection seismic data, VSP, borehole imaging logs, and in-situ stress field determination, SPE 29595.
R.A. Nelson, "Geologic analysis of naturally fractured reservoirs," Gulf Publishing Company, Houston.
W.H. Press, et al, "Numerical Recipes in Fortran," Cambridge University Press, Cambridge, UK.
I. Psencik, et al, Weak contrast PP wave displacement R/T coefficients in weakly anisotropic elastic media, Pure appl. Geophys. 151, pp. 699-718.
L.H. Reiss, "The reservoir engineering aspects of fractured formations," Editions Technip, Paris.
A. Rueger, "Reflection coefficients and azimuthal AVO analysis in anisotropic media," Society of Exploration Geophysicists, Tulsa.
C.M. Sayers, "Stress-induced fluid flow anisotropy in fractured rock," Transport in Porous Media 5, pp. 287-297.
C.M. Sayers, et al, "A simple technique for finding effective elastic constants of cracked solids for arbitray crack orientation statistics," Int. J. Solids and Structures, 27, pp. 671-680.
C.M. Sayers, et al, "Microcrack-induced elastic wave anisotropy of brittle rocks," J. Geophys. Res. B, 100, pp. 4149-4156.
C.M. Sayers, et al, "Azimuthal variation in AVO response for fractured gas sands," Geophysical Prospecting, 45, pp. 165-182.
C.M. Sayers, "Misalignment of the orientation of fracture and the principal axis for P- and S-waves in rocks containing multiple non-orthogonal fracture sets," Geophys. J. Int. 133, pp. 459-466.
C.M. Sayers, "Stress-dependent elastic anisotropy of sandstones," Geophysical Prospecting, 50, pp. 85-95.
M. Schenberg, et al., "Zoeppritz rationalized and generalized to anisotropy," J. of Seismic Exploration, 1, pp. 125-144.
Office Action issued in Chinese Patent Application No. 201080070370.2 on Apr. 29, 2016; 15 pages (with English Translation).

* cited by examiner

METHOD TO ENHANCE FIBER BRIDGING

FIELD OF THE INVENTION

This invention relates to a method to enhance fiber bridging thereby controlling lost circulation during drilling of a wellbore, and particularly for use in intermediate zones, i.e., non-reservoir sections of the well, normally below the surface casing, and pay zones. The current invention provides better bridging inside natural fractures thereby curing losses in larger size fractures and further improves stability against erosion losses. The inventive method utilizes small fibers making the method compatible with bottomhole assemblies of various drilling tools.

BACKGROUND OF THE INVENTION

During the drilling of a wellbore, various fluids are typically used in the well for a variety of functions. The fluids may be circulated through a drill pipe and drill bit into the wellbore, and then may subsequently flow upward through the wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

Fluid compositions used for these various purposes may be water- or oil-based and may comprise weighting agents, surfactants, proppants, and polymers. However, for a wellbore fluid to perform all of its functions and allow wellbore operations to continue, the fluid must stay in the borehole. Frequently, undesirable formation conditions are encountered in which substantial amounts or, in some cases, practically all of the wellbore fluid may be lost to the formation. For example, wellbore fluid can leave the borehole through large or small fissures or fractures in the formation or through a highly porous rock matrix surrounding the borehole.

Lost circulation is a recurring drilling problem, characterized by loss of drilling mud into downhole formations. It can occur naturally in formations that are fractured, highly permeable, porous, cavernous, or vugular. These earth formations can include shale, sands, gravel, shell beds, reef deposits, limestone, dolomite, and chalk, among others. Other problems encountered while drilling and producing oil and gas include stuck pipe, hole collapse, loss of well control, and loss of or decreased production.

Lost circulation may also result from induced pressure during drilling. Specifically, induced mud losses may occur when the mud weight, required for well control and to maintain a stable wellbore, exceeds the fracture resistance of the formations. A particularly challenging situation arises in depleted reservoirs, in which the drop in pore pressure weakens hydrocarbon-bearing rocks, but neighboring or inter-bedded low permeability rocks, such as shales, maintain their pore pressure. This can make the drilling of certain depleted zones impossible because the mud weight required to support the shale exceeds the fracture pressure of the sands and silts.

Lost circulation is frequently controlled by including an additive in fluids injected into wellbores. The most common additive used to control or cease lost circulation is bentonite which will seal small holes or fractures. Bentonite, in higher concentrations, increases viscosity and slows the fluid flow into the surrounding rock. Other solids, such as ground paper, ground corn cobs and sawdust, have also been used to control fluid loss. Polymers are also sometimes used to increase the viscosity of a wellbore fluid and to control fluid loss. Polymer additives, however, are generally more expensive than particulates such as bentonite.

The use of fibers and solids to prevent lost circulation during drilling operations has been widely described. Such fibers include, for example, jute, flax, mohair, lechuguilla fibers, synthetic fibers, cotton, cotton linters, wool, wool shoddy, and sugar cane fibers. One known process for preventing or treating lost circulation involves the addition, at concentrations ranging between about 1.43 and about 17.1 $kg/m^3$ of water-dispersible fibers having a length between about 10 and about 25 mm, for instance glass or polymer fibers, to a pumped aqueous base-fluid including solid particles having an equivalent diameter of less than about 300 microns. Another known process utilizes melt-processed inorganic fibers selected from basalt fibers, wollastonite fibers, and ceramic fibers.

Such known methods and compositions, however, do not effectively control fluid loss if low or moderate amounts of fibers are used. Therefore, a method for controlling loss and utilizing moderate and low levels of fibers is desirable. Moreover, such a process utilizing sufficiently small sized fibers so as to be consistent with downhole assemblies would be desirable.

SUMMARY OF THE INVENTION

Embodiments describe lost circulation materials that comprise a fiber and optionally solids suspended in a viscous fluid and a viscosity reducing agent. It has been found that reduction of fluid viscosity can significantly improve bridging efficiency in terms of the fiber loading required. In a fluid with low viscosity, fibers form aggregates with dimensions larger than the length and diameter of the original fibers. Such aggregation results in enhancement of bridging efficiency of fiber laden fluids and allows plugging of openings with fibers of smaller size. Also triggering a decrease in the base fluid viscosity provides a control over the position where the fiber material creates a plug. This enables using fibers in a wide range of concentrations for fighting circulation losses with minimized risk of plugging bottomhole assemblies of drilling tools.

In an aspect, embodiments provide methods of treating a geologic formation comprising: injecting into a wellbore a high viscosity composition which comprises a base fluid wherein the base fluid has an initial viscosity of 100 cP or greater and which exhibits a decrease in viscosity upon exposure to a viscosity reducing agent, and fibers wherein the fibers exhibit flocking upon a decrease in the viscosity of the base fluid; and injecting into the wellbore a viscosity reducing agent wherein the viscosity reducing agent is injected into the wellbore with or separately from the high viscosity composition.

In some embodiments of the inventive methods the base fluid is a polymer fluid.

In some embodiments of the inventive methods the viscosity reducing agent is a chemical additive selected from acids, bases, salts, surfactants, enzymes, oxidizing agents, organic solvents, mutual solvents, precursors thereof, and mixtures thereof.

In some embodiments of the inventive methods the viscosity reducing agent is a chemical additive selected from acids, calcium chloride, calcium hydroxide, sodium bicarbonate, polynaphthalene sulfonate salts, cationic surfactants, C16-C18 betaines, C14-C16 fatty alcohols, and butoxyethanol.

In some embodiments of the inventive methods the fibers are selected from PLA fibers, basalt fibers, soy bean fibers, PGA fibers, PVA fibers, PET fibers, glass fibers, polyester fibers, and combinations thereof, having a diameter of between 1 and 1000 micrometers and a length between 2 and 25 mm.

In some embodiments of the inventive methods the viscosity reducing agent is encapsulated in wax.

In some embodiments of the inventive methods the high viscosity composition further comprises solid particles.

In some embodiments of the inventive methods there are two or more different sizes of fibers.

In some embodiments of the inventive methods the wellbore is being subjected to hydraulic fracture stimulation at the time of treating the wellbore.

In some embodiments of the inventive methods the wellbore is being drilled at the time of treating the wellbore.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Although embodiments are discussed herein in connection with fluid loss control, it will be understood that the compositions used in the inventive methods may be used alternatively for diversion or for other purposes.

For example, embodiments may be used for controlling fluid flow through pathways in rock formations penetrated by a borehole in a subterranean well, i.e., for treatments associated with well-service activities that are conducted throughout the life of a well, including (but not limited to) well construction, well stimulation and workover operations.

Embodiments will be described for hydrocarbon production wells, but it is to be understood that said embodiments may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Figure 1:
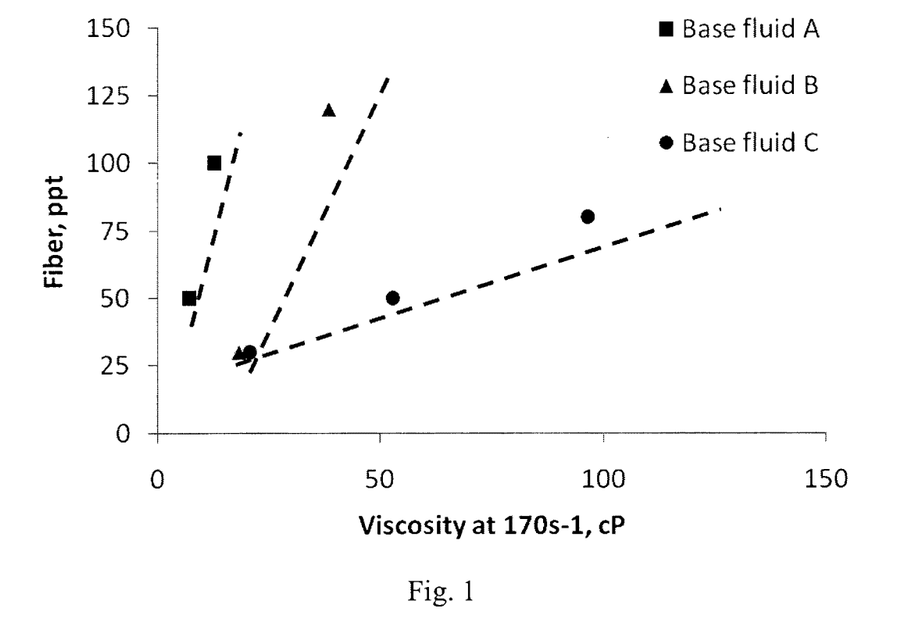
FIG. 1 is a graph of fiber loading required for bridging as a function of fluid viscosity for three base fluids containing: A which is mixture of quaternary ammonium compound and alkylaryl sulfonate and ammonium nitrate solution, B which is erucic amidopropyl dimethyl betaine; and C which is a guar-base linear gel.

One of the key mechanisms involved in plugging fractures and controlling fluid loss therethrough is fiber bridging. FIG. 1 displays the dependence of the minimal fiber concentration needed to bridge a 2 mm slot as a function of carrier fluid viscosity, for different fluids. As can be seen in FIG. 1, viscosity strongly affects the bridging abilities of a fiber loaded fluid: the higher the viscosity, the less bridging. That is, for a given fiber concentration, the higher the viscosity, the lower the bridging abilities.

Embodiments take advantage of this property. Specifically, embodiments provide methods in which a high viscosity fluid is used to deliver fibers downhole without bridging or plugging the equipment. In addition, a higher viscosity fluid can deliver fibers that will later floc at a lower flow rate. With the current embodiments, an operator can use not only a lower fiber concentration, but also fibers of lower aspect ratio, shorter fibers, denser fibers, a narrower fiber length distribution, smoother fibers, and/or less-stiff fibers and be able to transport them and then cause them to bridge when and where desired. Following delivery downhole, the viscosity is reduced (i.e., by a 'trigger'), and fiber bridging occurs, for example due to flocculation (entanglement), thereby diverting fluid or plugging fractures and reducing or eliminating fluid loss.

The inventive methods comprise:

(a) preparing a mixture that comprises at least one type of fiber and at least one type of a base fluid;

(b) injecting or delivering the mixture into a wellbore; and (c) triggering a drop in viscosity of the base fluid thereby causing increased fiber bridging.

Base fluids useful in embodiments of the invention include those fluids which exhibit a range of controllable viscosities. That is, the base fluids useful in the invention may have a high viscosity under specific conditions, such as specific pH, salt concentration, temperature, ionic concentration and/or specific ion presence, and/or combinations of such conditions, and have a lower viscosity under other specific conditions.

Base fluids useful in embodiments include polymer fluids, cross-linked polymer fluids, guar-based fluids, gelled water, emulsions, foams, and combinations thereof. An aqueous base fluid may be made with fresh water, seawater, brine, etc., depending upon compatibility with the viscosifier and the formation.

In some embodiments, the base fluid is a guar gum or crosslinked guar gum. Guar and derivatized guar powders are used in well fracturing applications to produce polymer solutions and crosslinked polymer solutions (i.e., gels) suitable as fracturing fluids to translate hydraulic force sufficient to initiate and propagate a fracture. The guar and derivatized guar products useful in the invention are initially obtained as either finely ground powders or dispersions of those same powders in non-aqueous suspensions. Non-aqueous suspensions of guar or derivatized guar powders are typically called slurries, guar slurries, or derivatized guar slurries if, in the case of the latter, the dispersed and suspended guar powder is a derivatized guar. The powder or non-aqueous slurry is mixed with an aqueous fluid to make the aqueous base fluid. Guar derivatives useful in the invention include but are not limited to hydroxyalkyl guars, carboxyalkyl guars, and carboxyalkyl hydroxyalkyl guars. Preferred guar derivatives include hydroxypropyl guars (HPG), carboxymethyl guars (CMG), and carboxymethyl hydroxypropyl guars (CMHPG).

Fibers useful may be degradable or stable under downhole conditions. Fibers useful include, for example, polylactic acid (PLA) fibers, basalt fibers, wollastonite fibers, soy bean fibers, polyglycolic acid (PGA) fibers, polyvinyl alcohol (PVA) fibers, fibers comprising copolymers of PLA and/or PGA, polyethylene terephthalate (PET) fibers, polyester fibers, polyamide fibers, polylactone fibers, and combinations thereof. Non-degradable fibers, for example glass fibers, may also be used, especially in non-reservoir sections. The fibers typically have a diameter between about 1 and about 1000 micrometers, preferably between about 6 and about 200 micron, and most preferably between about 10 and about 20 microns. The fibers typically have an aspect ratio of greater than about 100. Suitable fibers have a length between about 2 and about 25 mm, preferably between about 3 and about 18 mm, and most preferably about 6 mm; they have a diameter of about 1 to about 1000 microns. The fibers may not be of uniform size and may include a mixture of different sizes of or compositions of fibers. The fibers are loaded into the base fluid in concentrations between about 2 and about 72 g/L (about 17-600 ppt (pounds per thousand pounds)), preferably between about 12 and about 36 g/L (about 100-300 ppt), and most preferably about 18 g/L (150 ppt).

Mixtures of fibers may also be used, for example as described in U.S. Patent Application Publication No. 20100152070. For example, the fibers may be a blend of long fibers and short fibers. Preferably, the long fibers are rigid and the short fibers are flexible. It is believed that such long fibers form a tridimensional mat or net in the flow pathway that traps the particles, if present, and the short fibers.

For the particles, the size is about 5-1000 µm, preferably about 10-300 µm, and most preferably about 15-150 µm. The particle loading range is typically the same as the fiber loading range. Particles can be made of, but are not limited to, polylactic acid or any polyesters, calcium carbonates, quartz, mica, ceramics, or any particulate materials currently used in for example drilling, completion or stimulation.

The particles may optionally be a mixture of coarse, medium, and optionally also fine particles. Such mixtures of particles, that because of their size distributions may be more prone to plugging, are well known in the art. Optionally, proppant may be all or some portion of the particles.

For optimal cleanup after the treatment, degradable particles comprising (but not limited to) polylactic acid, polyglycolic acid and polyester are preferred. The preferred solid-particle-size range is between about 5 µm and 1000 µm, more preferably between about 10 µm and 300 µm, and most preferably between about 15 µm to 150 µm. The preferred solid-particle concentration range is between about 6 g/L and 72 g/L, more preferably between about 12 g/L and 36 g/L, and most preferably between about 15 g/L and 20 g/L.

The composition, size, and concentration of the fibers and the optional particles may be fine-tuned for each application.

Viscosity reducing agents, the triggering mechanism, may be selected from chemical triggers, such as, oxidizers, enzymes, organic solvents, inorganic salts (especially multivalent), organic salts (especially multivalent), bromates, and/or physical triggers, such as shear (for example by the drill bit), temperature, combinations of any subset of chemical triggers, combinations of physical triggers, and any combination of chemical and physical triggers.

It should be noted that lower concentrations of triggers that are more commonly used as breakers, for example for polymers, for example as low as one tenth the normally used concentrations, may often be used, because there is a need only to reduce the viscosity, not to break the polymer fully, and because in many instances the viscosifier loading may be lower than commonly used because the viscosifier may not need to maintain viscosity as long as in other treatments. For the same reasons, weaker, or poorer, breakers may be used as triggers, for example some breakers such as oxidizing agents may be used at temperatures below which they are normally used, and others, such as enzymes, may be used at temperatures above which they are normally used.

In some embodiments, the mechanism for triggering a decrease in viscosity of the base fluid is one or more chemical components ("chemical trigger"). The choice of trigger is based upon the nature of the viscosifying agent. Naturally, the viscosifying agent and fiber (and trigger (or trigger precursor) if in the same fluid) should always be tested in the laboratory for compatibility. Chemical trigger(s) include acids, such as citric acid, acetic acid, formic acid, hydrochloric acid, calcium chloride, and polyelectrolyte polymers such as polynaphthalene sulfonate salts, cationic surfactants, amphoteric and zwitterionic materials such as C16-C18 betaines, C14-C16 fatty alcohols, and mutual solvents such as butoxyethanol. Triggers may be added in the form of precursors; for example esters are precursors of acids and alcohols; chelated polyvalent metals are precursors to polyvalent metals.

In some cases, depending upon the chemical nature of the viscosifying agent, the fiber, and the triggering agent, the breakdown products of the viscosifier or reactions or associations between the broken viscosifier and the trigger or spent trigger may aid in fiber flocculation.

The chemical trigger(s) may, in some embodiments, be included in the base fluid mixture. In such embodiments, the chemical trigger(s) may be encapsulated for delayed release into the base fluid. Exemplary encapsulated chemical triggers include, for example, wax-coated citric acid and sodium bicarbonate, commercially available from Jungbunzlauer, Basel, Switzerland, wherein the coating (up to 40% of the final product) is made of hydrogenated vegetal oil (palm or sunflower), with a melting point between 60° C. and 70° C. Encapsulated calcium hydroxide is commercially available from Rhodia Boulogne-Billancourt, France, produced through a dry emulsion process and supported on silica.

In alternative embodiments, the chemical trigger(s) may be separately delivered or injected into the wellbore if and when a decrease in base fluid viscosity is desired so as to promote fiber bridging. In yet other embodiments, the chemical trigger(s) may be otherwise delivered to the wellbore as part of other wellbore fluids, such as drilling mud.

Delivery of the mixture downhole can be performed by injecting the fluid or fluids into the well: (1) through drilling pipe; (2) through coiled tubing including for example, a microcoil with a diameter of about 1.25 cm (one-half inch) or less; (3) through the annulus space between any tubular strings positioned in the wellbore; (4) by using bailers or downhole containers; through any tubular strings positioned in the wellbore; (5) pumping downhole through casing; or (6) any combination of the foregoing methods. In some instances, the viscosity reducing agents, i.e. chemical triggers, are added into the base fluid plus fiber mixture prior to being added to the wellbore. In alternative embodiments, the chemical triggers may be pumped separately from the high viscosity base fluid plus fiber mixture. Where separately added to the wellbore, the chemical triggers may be added to the wellbore using any appropriate technique, including those listed above with mixing with the high viscosity mixture occurring in the wellbore, or in a fracture. When chemical triggers are pumped separately, they may be pumped simultaneously with the base fluid through a different pathway from the base fluid, or they may be pumped after the base fluid through the same or a different pathway.

In treatment for lost circulation, fibers, optional particulates and a triggering agent are preferably mixed together in a polymer fluid and pumped downhole as a separate pill. The typical treatment volume is about 100 bbl (15.90 kg/L); alternatively, as much as about 150 bbl (23.85 kg/L); or alternatively down to about 50 bbl (7.95 kg/L).

For use in diversion circumstances, between about 12 and about 18 kg/m$^3$ of fiber and between about 450 and 500 kg/m$^3$ of proppant are used. All values and subranges between 12 and 18 kg/m3 of fibers are included herein and disclosed herein. For example, the fiber amount may have an upper limit of 13, 14, 15, 16, 17, or 18 kg/m$^3$ and a lower limit of 12, 13, 14, 15, 16, or 17 kg/m$^3$. All values and subranges between 450 and 500 kg/m$^3$ of proppant are included herein and disclosed herein. For example, the proppant amount may have an upper limit of 460, 470, 480, 490, or 500 kg/m$^3$ and a lower limit of 450, 460, 470, 480 or 490 kg/m$^3$.

In fracture stimulation treatments, diversion, utilizing fibers, generally follows proppant treatment. Fiber concentration in such applications may vary in the range from 2 to 20 kg/m$^3$; alternatively, from 5 to 17 kg/m$^3$; alternatively, from 7 to 15 kg/m$^3$; alternatively, from 10 to 18 kg/m$^3$. All values and subranges between 2 and 20 kg/m$^3$ of fiber concentration are disclosed and included herein; that is, the fiber concentration may have a lower limit, for example, of 2, 4, 6, 8, 10, 12, 14, 16, or 18 kg/m$^3$ and an upper limit, for example, of 4, 6, 8, 10, 12, 14, 16, 18, or 20 kg/m$^3$. Diverting fluid may also comprise one or more proppants in concentrations from 60 kg/m$^3$ to 1500 kg/m$^3$; alternatively, from 150 kg/m$^3$ to 1000 kg/m$^3$; alternatively, from 200 kg/m$^3$ to 750 kg/m$^3$; alternatively, 240 kg/m$^3$ to 480 kg/m$^3$. All values and subranges between 60 and 1500 kg/m$^3$ of proppant concentration are disclosed and included herein; that is, the proppant concentration may have a lower limit, for example, of 60, 120, 240, 300, 500, 680, 900, 1100 or 1450 kg/m$^3$ and an upper limit, for example, of 90, 150, 270, 390, 510, 650, 770, 890, 930, 1180, 1250, 1390, 1460 or 1500 kg/m$^3$. The volume of the diverting fluid may vary between 0.1 m$^3$ to 30 m$^3$; alternatively from 0.5 m$^3$ to 20 m$^3$; alternatively from 1.0 m$^3$ to 15 m$^3$; alternatively from 3 m$^3$ to 10 m$^3$; alternatively from 5 m$^3$ to 8 m$^3$; alternatively from 1.5 m$^3$ to 5 m3. All values and subranges between 0.1 m$^3$ to 30 m$^3$ are disclosed and included herein; that is, the volume of diverting fluid may have a lower limit, for example, of 0.1, 1.4, 2.9, 5.0, 6.6, 9.0, 14.5, 23, or 28 m$^3$ and an upper limit, for example, of 1, 6, 14, 22.5, 28, or 30 m$^3$.

EXAMPLES

The Inventive Examples illustrate some of the particular embodiments, but the following should not be construed to mean the invention is limited to such particular embodiments.

Inventive Examples 1-4 and Comparative Examples 1-4

Utilizing VES in Base Fluid

The base fluids used in Inventive Examples 1-4 and Comparative Examples 1-4 are shown in Table 1.

TABLE 1

| Base Fluid | 90 wt % oleic acid 10 wt % acetic acid | Wt % NaOH | Wt % KCl |
|---|---|---|---|
| 1 | 1.0 total wt % | 0.4 | 5 |
| 2 | 2.0 | 0.6 | 5 |
| 3 | 3.0 | 0.8 | 5 |
| 4 | 4.0 | 1.0 | 5 |

NaOH controlled the base fluid pH to around 12.5. The acetic acid in the mixture aids in fluidizing the oleic acid at room temperature. When the oleic acid/acetic acid is added, no hydration time is required to build viscosity. As soon as the surfactant was added to the brine (KCl and NaOH), the viscosity increased and reached its final state in less than a minute.

To prepare fiber-loaded samples, the fibers were added to the brine and dispersed with an overhead mixer. When the fibers were adequately dispersed, the oleic acid/acetic acid mixture was added to the fluid and further mixed with the overhead mixer until viscosity built up.

Comparative Example 1 was prepared as discussed above with the following particulars. Base fluid 2 was loaded with 150 ppt (9 g/L) of PLA fibers having a 6 mm length and 12 micron diameter. Comparative Example 1 was not triggered and the fibers did not plug a 1.62 mm slot at a flow rate of 300 mL/min with an internal slot velocity of 18.5 cm/sec.

Figure 2:
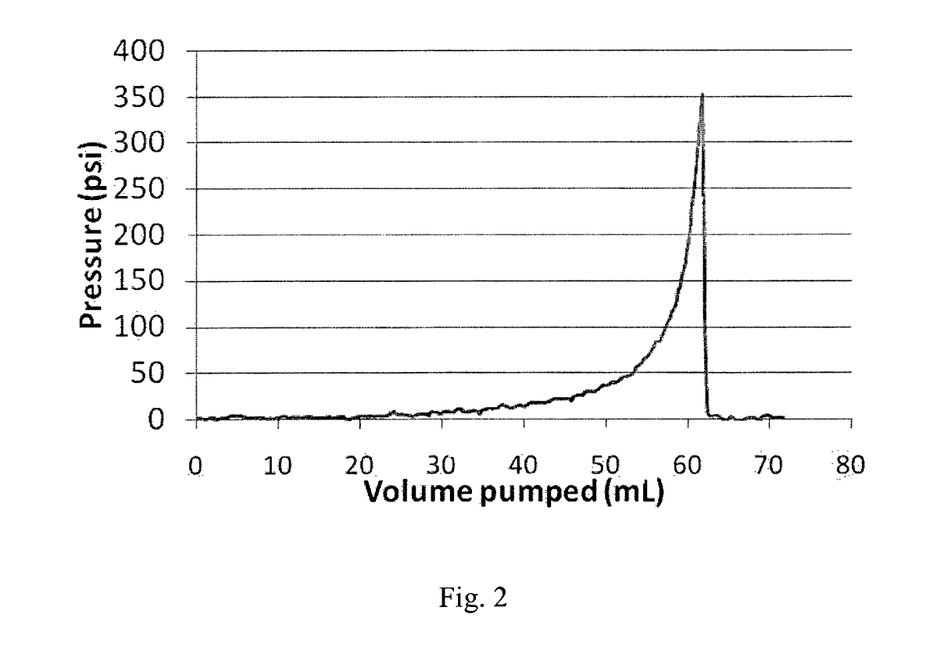
FIG. 2 is a graph of pressure vs. volume illustrating the increase in pressure in the slot as fibers formed a floc for Inventive Example 1.

Inventive Example 1 was prepared as described for Comparative Example 1. Following loading the base fluid into the tube, 500 ml citric acid solution (200 g/L) was added with mixing inside the tube with a plastic rod. As a fiber floc formed, pressure increased in the slot, as shown in FIG. 2. At a pressure of 350-400 psi (2, 4 MPa-2.7 MPa), material was extruded through the 4.83 mm slot. A flow rate of 300 mL/min was used with an internal slot velocity of 6.2 cm/sec.

Comparative Example 2 was prepared and tested as Inventive Example 1 except that a lower loading of fiber, namely 50 ppt (3 g/L) was used. At this level of fiber loading no bridging or plugging was observed.

Figure 3:
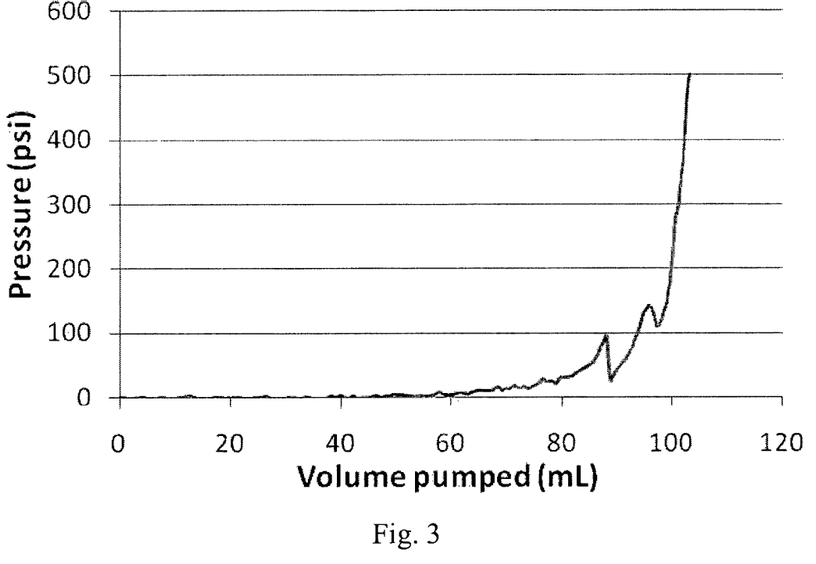
FIG. 3 is a graph of pressure vs. volume illustrating the increase in pressure in the slot as fibers formed a floc for Inventive Example 2.

Inventive Example 2 was prepared as was Comparative Example 2 except that no citric acid trigger was added to the tube. Instead, 9 ml of calcium chloride solution (299 g/L) was added to the base fluid prior to loading into the tube. Inventive Example 2 was tested at 300 mL/min flow rate, 4.83 mm slot, and 6.2 cm/sec internal slot velocity. The pressure reached its maximum of 3.45 MPa (500 psi) before all fluid was pumped out of the slot. The pressure profile is shown in FIG. 3.

Inventive Example 3 was prepared as was Inventive Example 2 but tested on a larger scale device with a separate line for addition of the calcium chloride trigger solution. The larger scale device included a 4 mm channel with a 2 mm restriction. Free flow was observed until the calcium chloride solution was added through the separate line. Upon addition of the trigger solution, calcium oleate was observed to precipitate followed immediately by fiber floc formation and plugging of the channel.

Comparative Example 3 was prepared as was Inventive Example 2 except that a lower loading of fiber, namely 50 ppt (3 g/L) was used. At this level of fiber loading, no bridging or plugging was observed in the larger scale device.

Comparative Example 4 was prepared and tested as Inventive Example 1 except that no citric acid solution was added to the tube. Rather, a solution of sodium bicarbonate was added to the base fluid plus fiber mixture prior to loading into the tube. While bridging and fiber accumulation was observed behind the 4.83 mm slot, no plugging was observed.

Figure 4:
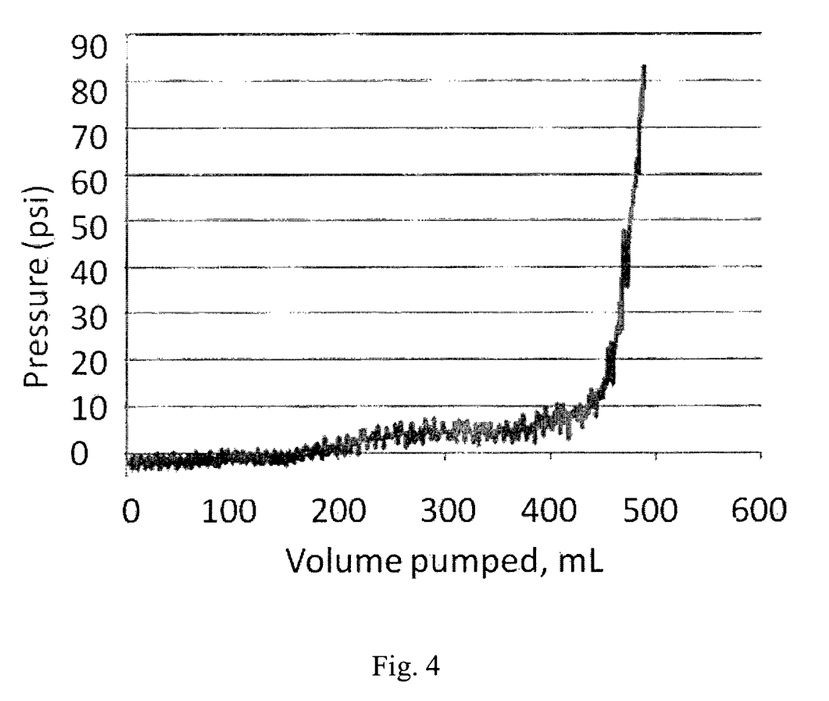
FIG. 4 is a graph of pressure vs. volume illustrating the increase in pressure in the slot as fibers formed a floc for Inventive Example 4.

Inventive Example 4 was prepared as was Comparative Example 4. In addition to the fibers and sodium bicarbonate, calcium carbonate particles having a particle size of D50=69 microns were added at a level of 60 g/L to the base fluid. The pressure in the tube increased as shown in FIG. 4 before all fluid was pumped out of the tube.

Table 2 summarizes the bridging and plugging behavior of Inventive Examples 1-4 and Comparative Examples 1-4.

TABLE 2

| Fiber loading | Trigger | Slot size | Velocity in slot | Bridge/Plug |
| --- | --- | --- | --- | --- |
| 150 ppt (9 g/L) | none | 1.62 mm | 18.5 cm/s | no |
| 50 ppt (3 g/L) | citric acid | 4.83 mm | 6.2 cm/s | no |
| 150 ppt (9 g/L) | citric acid | 4.83 mm | 6.2 cm/s | yes, extruded |
| 50 ppt (3 g/L) | $CaCl_2$ | 4.83 mm | 21 cm/s | no |
| 150 ppt (9 g/L) | $CaCl_2$ | 4.83 mm | 6.2 cm/s | yes, plugged |
| 150 ppt (9 g/L) | $CaCl_2$ | 2 mm | 16.7 cm/s | yes, plugged |
| 150 ppt (9 g/L) | $NaHCO_3$ | 4.83 mm | 6.2 cm/s | bridge, no plug |
| 150 ppt (9 g/L) + 60 g/L $CaCO_3$ particles | $NaHCO_3$ | 4.83 mm | 6.2 cm/s | bridge, pressure increase but no plug |

Inventive Examples 5-6 and Comparative Examples 5-6

Utilizing Crosslinked Guar in Base Fluid

The base fluid used in Inventive Examples 5-6 and Comparative Examples 5-6 were based on a crosslinked guar polymer. 0.9 g/L Guar (15 ppt) was crosslinked by 0.3 g/L (5 ppt) boric acid, and 0.06 g/L (1 ppt) sodium hydroxide flakes. The base fluids further included fibers, as described above in connection with Inventive Examples 1-4 and Comparative Examples 1-4 at the fiber loading levels specified below.

Inventive Examples 5-6 and Comparative Examples 5-6 were tested in the tube apparatus and in a small slot bridging device, as described in detail under Test Methods below.

Comparative Example 5 was the crosslinked guar polymer with 6 g/L (100 ppt) fibers.

Figure 5:
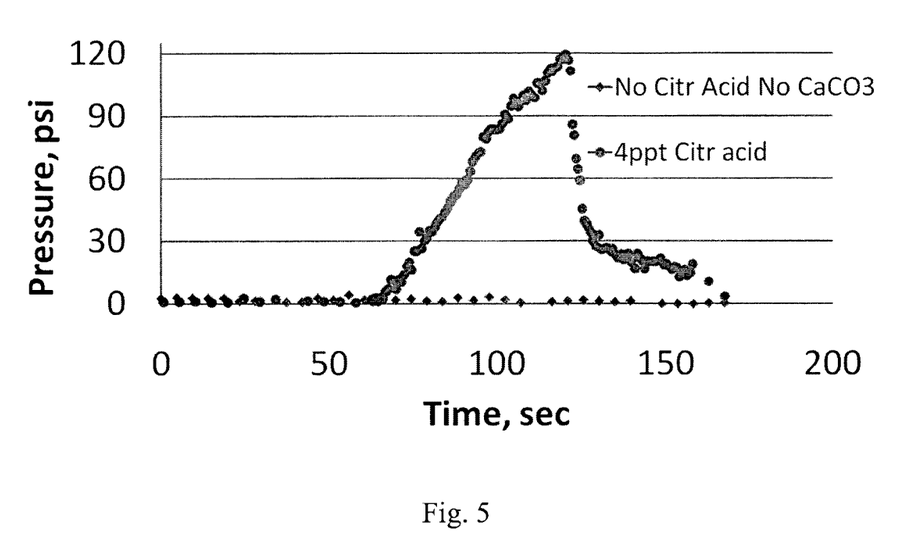
FIG. 5 is a graph of pressure vs. time illustrating the increase in pressure in the slot as fibers formed a floc for Comparative Example 6

Comparative Example 6 was the crosslinked guar polymer with 6 g/L (100 ppt) fibers and 0.24 g/L (4 ppt) citric acid. The addition of the citric acid caused the de-crosslinking of the guar polymer. FIG. 5 illustrates the pressure response as a function of time of Comparative Examples 5 and 6 run in a tube with a 5 mm slot, at 300 ml/min flow rate, and with a velocity inside slot of 18.5 cm/s. As anticipated, a fiber floc formed and pressure increased in the tube for Comparative Example 6 with no pressure increase for Comparative Example 5. The fiber floc formed with Comparative Example 6, however, was not sufficiently dense to stop fluid flow. Subsequent testing with the further addition of 9 g/L (150 ppt) of calcium carbonate particles in Comparative Example 6 showed a significantly greater increase in pressure and concomitant reduced fluid flow.

Inventive Example 5 was prepared as Comparative Example 5.

Inventive Example 6 was prepared as Comparative Example 5 except that 9 g/L (150 ppt) of fibers were used in lieu of 6 g/L (100 ppt) of fibers. Inventive Examples 5 and 6 were tested at various fluid velocities and with various levels of calcium carbonate loading in the small bridging device. Floc formation with the passage of fluid and blocking of particulates is termed bridging and the blocking of both particulates and fluids is termed plugging.

In the small slot bridging device, Inventive Example 5 exhibited: (1) bridging with no calcium carbonate particulates at fluid velocities of 100 and 250 ml/min; (2) plugging at a fluid velocity of 100 ml/min and calcium carbonate loadings of 9 g/L (150 ppt), 18 g/L (300 ppt), 36 g/L (600 ppt), and at 250 ml/min at a calcium carbonate loading of 9 g/L (150 ppt); and (3) no bridging or plugging with or without calcium carbonate particulate loadings at 750 and 1000 ml/min fluid flow.

In the small slot bridging device, Inventive Example 6 exhibited: (1) plugging at 9 g/L (150 ppt) calcium carbonate loading and fluid flows of 100, 250 and 500 ml/min; (2) bridging with no calcium carbonate particulates at 100, 250 and 500 ml/min fluid flow; and (3) no bridging or plugging at 750 ml/min fluid flow with no calcium carbonate particulates or with 9 g/L (150 ppt) calcium carbonate particulate loading.

Inventive Example 7 Utilizing Uncrosslinked Guar in Base Fluid 3.6 g/L (60 ppt) PLA fibers having dimensions of 6 mm by 12 μm were thoroughly dispersed in an aqueous fluid containing 2.4 g/L (40 ppt) guar and 0.18 g/L of an oxidizing breaker, ammonium persulfate. When the temperature was raised there was obvious formation of fiber aggregates within 10 minutes.

Test Method

Small Slot Bridge Testing Device

Figure 6:
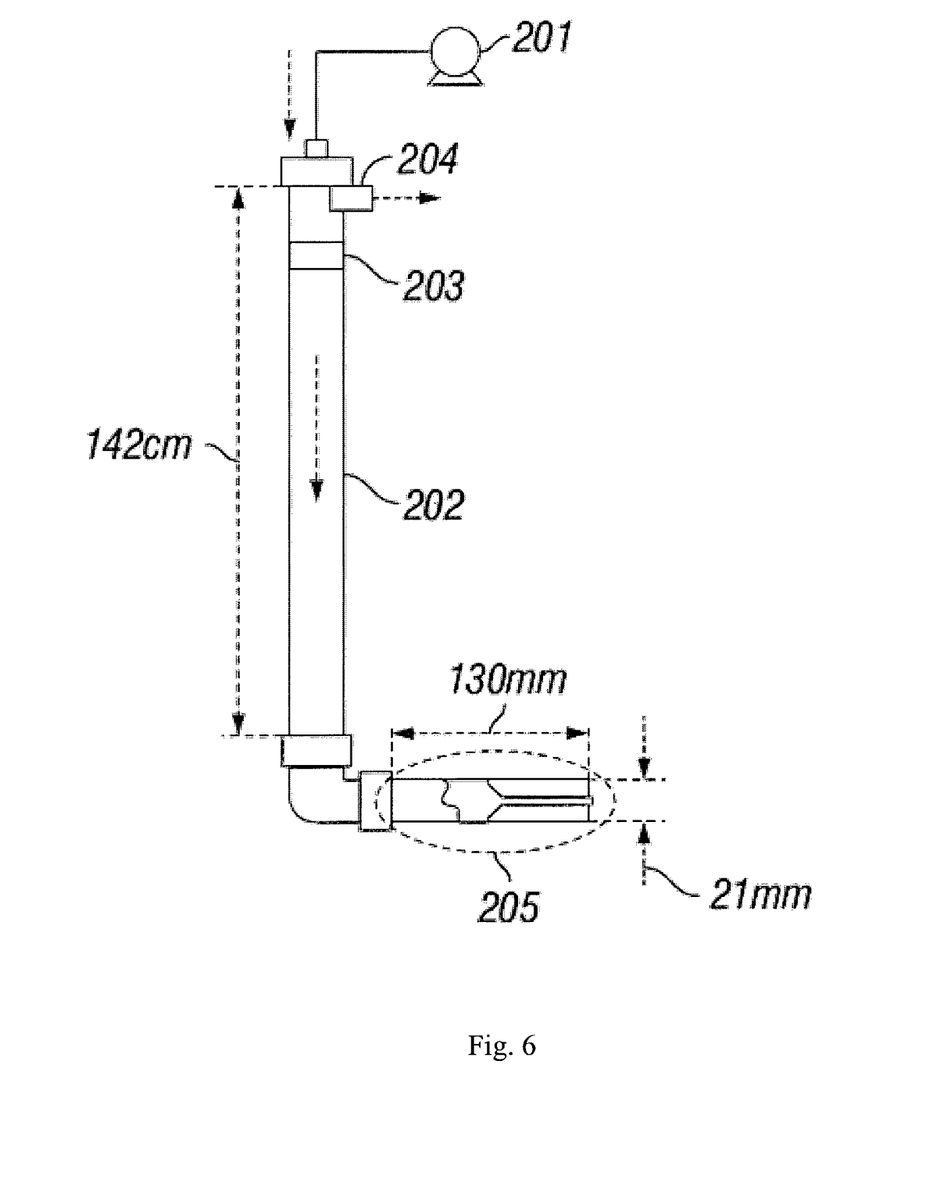
FIG. 6 is a schematic diagram of an apparatus for evaluating the plugging ability of a treatment fluid.

The small slot bridge testing device was a metal tube filled with the formulation to be tested, pushed through a slot of varying diameter with an HPLC pump pumping water. The maximum flow rate was 1 L/min. Pressure was monitored with a pressure transducer (available from Viatran, Inc.) and the device was operated at a maximum pressure of 500 psi (34.5 bar). The apparatus was constructed by the inventors, and was designed to simulate fluid flow into a formation-rock void; it is shown schematically in FIG. 6. A pump 201 was connected to a tube 202. The internal tube volume was 500 mL. A piston 203 was fitted inside the tube. A pressure sensor 204 was fitted at the end of the tube between the piston and the end of the tube that was connected to the pump. A slot assembly 205 was attached to the other end of the tube.

Figure 7:
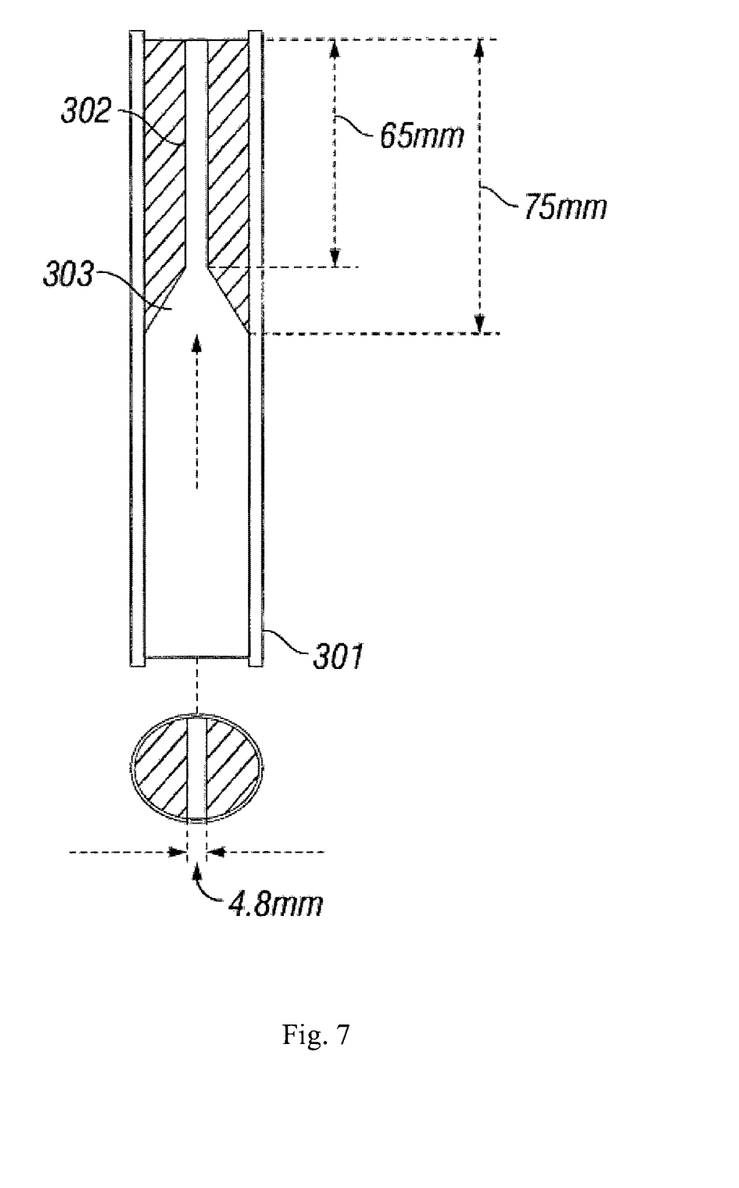
FIG. 7 is a detailed diagram of the slot of the apparatus depicted in FIG. 6.

A detailed view of the slot assembly is shown in FIG. 7. The outer part of the assembly was a tube 301 whose dimensions are 130 mm long and 21 mm in diameter. The slot 302 was 65 mm long and 4.8 mm wide. Preceding the slot was a 10-mm long tapered section 303.

The present invention may be embodied in other forms without departing from the spirit and the essential attributes thereof, and, accordingly, reference should be made to the appended claims, rather than to the foregoing specification, as indicating the scope of the invention.

We claim:

1. A method of treating a geologic formation having one or more pathways through which a fluid may flow from a wellbore into the geologic formation, comprising:
   preparing a fiber laden fluid viscosified solely by a crosslinked polymer such that the initial fluid viscosity is higher than or equal to 100 cP;
   injecting the fiber laden fluid into a wellbore such that, during injection, the fibers exhibit flocking inside the wellbore resulting from a viscosity reduction triggered by exposure to a viscosity reducing agent; and
   sealing the one or more pathways by allowing the flocked fibers to bridge across or within pathways leading from the wellbore into the geologic formation, thereby controlling fluid flow from the inside of the wellbore into the geologic formation,
      wherein the viscosity reducing agent is either incorporated into the fiber laden fluid during the preparation or introduced separately inside the wellbore,
      wherein, the fiber laden fluid further comprises proppant or particles made from polylactic acid, polyglycolic acid, or polyester, or mixtures thereof, and
      wherein the flocking and sealing occurs within 100 seconds of the exposure of the fiber laden fluid to the viscosity reducing agent.

2. The method of claim 1 wherein the fiber laden fluid is viscosified with a crosslinked guar polymer.

3. The method of claim 1 wherein the viscosity reducing agent is a chemical additive selected from acids, bases, salts, surfactants, enzymes, oxidizing agents, polyelectrolyte polymers, organic solvents, mutual solvents, precursors thereof, and mixtures thereof.

4. The method of claim 3 wherein the viscosity reducing agent is a chemical additive selected from acids, calcium chloride, calcium hydroxide, sodium bicarbonate, polynaphthalene sulfonate salts, cationic surfactants, C16-C18 betaines, C14-C16 fatty alcohols and butoxyethanol.

5. The method of claim 1 wherein the fibers are selected from PLA fibers, basalt fibers, soy bean fibers, PGA fibers, PET fibers, PVA fibers, glass fibers, polyester fibers, and combinations thereof, having a diameter of between 1 and 1000 micrometers and a length between 2 and 25 mm.

6. The method of claim 3 wherein the viscosity reducing agent is encapsulated in wax.

7. The method of claim 1 wherein there are two or more different sizes of fibers.

8. The method of claim 1 wherein the formation is treated during drilling to form the bridge for lost circulation control or fluid loss control.

9. The method of claim 1, wherein the formation is treated for diversion.

10. The method of claim 1, wherein the injection of the fiber laden fluid is free of bridging prior to the viscosity decrease.

11. A method for treating a geologic formation having one or more fractures, comprising:
    preparing a fiber laden fluid viscosified solely by a crosslinked polymer such that the initial fluid viscosity is higher than or equal to 100 cP;
    injecting the fiber laden fluid into a wellbore such that, during injection, the fibers exhibit flocking inside the wellbore resulting from a viscosity reduction triggered by exposure to a viscosity reducing agent; and
    sealing the one or more fractures by allowing the flocked fibers to enter the one or more fractures and form a bridge,
       wherein the viscosity reducing agent is either incorporated into the fiber laden fluid during the preparation or introduced separately inside the wellbore, and
       wherein the flocking and sealing occurs within 100 seconds of the exposure of the fiber laden fluid to the viscosity reducing agent.

12. The method of claim 11 wherein the viscosity reducing agent is a chemical additive selected from acids, bases, salts, surfactants, enzymes, oxidizing agents, polyelectrolyte polymers, organic solvents, mutual solvents, precursors thereof, and mixtures thereof.

13. The method of claim 11 wherein the viscosity reducing agent is a chemical additive selected from acids, calcium chloride, calcium hydroxide, sodium bicarbonate, polynaphthalene sulfonate salts, cationic surfactants, C16-C18 betaines, C14-C16 fatty alcohols, and butoxyethanol.

14. The method of claim 13 wherein the viscosity reducing agent is a chemical additive selected from cationic surfactants, C16-C18 betaines, and C14-C16 fatty alcohols.

15. The method of claim 11 wherein the fiber laden fluid is injected into the wellbore without plugging a bottomhole assembly of a drilling tool.

16. The method of claim 11 wherein the fiber laden fluid is injected into the wellbore without plugging equipment used for injecting the fiber laden fluid.

17. A method of treating a geologic formation, comprising:
    preparing a fiber laden fluid viscosified solely by a crosslinked polymer such that the initial fluid viscosity is higher than or equal to 100 cP;
    during a fracture stimulation treatment, injecting the fiber laden fluid into a wellbore such that, during injection, the fibers exhibit flocking inside one or more fractures induced during the fracture stimulation treatment, the flocking triggered by exposure to a viscosity reducing agent; and
    sealing the induced fractures by allowing the flocked fibers to form a bridge within the fractures,
       wherein the viscosity reducing agent is either incorporated into the fiber laden fluid during the preparation or introduced separately inside the wellbore, and
       wherein the flocking and sealing occurs within 100 seconds of the exposure of the fiber laden fluid to the viscosity reducing agent.

18. The method of claim 17 wherein the viscosity reducing agent is a chemical additive selected from acids, bases, salts, surfactants, enzymes, oxidizing agents, polyelectrolyte polymers, organic solvents, mutual solvents, precursors thereof, and mixtures thereof.

19. The method of claim 17 wherein the viscosity reducing agent is a chemical additive selected from acids, calcium chloride, calcium hydroxide, sodium bicarbonate, polynaphthalene sulfonate salts, cationic surfactants, C16-C18 betaines, C14-C16 fatty alcohols, and butoxyethanol.

20. The method of claim 19 wherein the viscosity reducing agent is a chemical additive selected from cationic surfactants, C16-C18 betaines, and C14-C16 alcohols.

* * * * *